US012657484B2

(12) United States Patent
Hosomi et al.

(10) Patent No.: US 12,657,484 B2
(45) Date of Patent: Jun. 16, 2026

(54) INFERENCE DEVICE, INFERENCE METHOD, AND RECORDING MEDIUM

(71) Applicant: NEC Corporation, Tokyo (JP)

(72) Inventors: Itaru Hosomi, Tokyo (JP); Daichi Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 691 days.

(21) Appl. No.: 18/014,428

(22) PCT Filed: Jul. 8, 2020

(86) PCT No.: PCT/JP2020/026660
§ 371 (c)(1),
(2) Date: Jan. 4, 2023

(87) PCT Pub. No.: WO2022/009326
PCT Pub. Date: Jan. 13, 2022

(65) Prior Publication Data
US 2023/0252321 A1      Aug. 10, 2023

(51) Int. Cl.
*G06N 5/02*          (2023.01)

(52) U.S. Cl.
CPC .................................... *G06N 5/027* (2013.01)

(58) Field of Classification Search
CPC ..................................................... G06N 5/027

(Continued)

(56) References Cited

U.S. PATENT DOCUMENTS

2016/0267384 A1      9/2016   Salam et al.
2018/0314951 A1      11/2018  Sadamasa et al.
(Continued)

FOREIGN PATENT DOCUMENTS

JP        H10-240535  A       9/1998
WO        2017/081715 A1      5/2017
(Continued)

OTHER PUBLICATIONS

Fischer, et al., "Abductive reasoning as a way of worldmaking", Foundations of science 6: 361-383, 2001 (Year: 2001).*

(Continued)

*Primary Examiner* — Tsu-Chang Lee
(74) *Attorney, Agent, or Firm* — Sughrue Mion, PLLC

(57)          ABSTRACT

In an inference device, an acquisition means acquires first observation data and first knowledge base which is formed by a rule representing a pair of a premise and a consequence of the premise. A rule conversion means reverses the premise and the consequence of the rule forming the first knowledge base, and generates a second knowledge base formed by a rule deriving the premise from the consequence. An inference execution means executes an abductive inference using the second knowledge base and the first observation data, and generates a first hypothesis set represented by a directed graph. A data extraction means extracts an element serving as a starting point in the directed graph representing the first hypothesis set, and generates second observation data. Accordingly, the inference execution means executes the abductive inference by using the first knowledge base and the second observation data, and generates a second hypothesis set.

7 Claims, 13 Drawing Sheets

(58) Field of Classification Search
USPC ......................................................... 706/50
See application file for complete search history.

(56) References Cited

U.S. PATENT DOCUMENTS

| | | | |
|---|---|---|---|
| 2020/0118013 A1 | 4/2020 | Yamamoto | |
| 2020/0310449 A1* | 10/2020 | Nedunuri ............... | G06N 5/041 |
| 2021/0125090 A1 | 4/2021 | Sasaki et al. | |

FOREIGN PATENT DOCUMENTS

| | | | |
|---|---|---|---|
| WO | 2018/229877 A1 | 12/2018 | |
| WO | 2020/003585 A1 | 1/2020 | |

OTHER PUBLICATIONS

Behfar, et al., "Discovery within validation logic: deliverately surfacing, complementing, and substituting abductive reasoning in hypothetico-dedudtive inquiry", Organization science, vol. 29, No. 2, Mar.-Apr. 2018, pp. 323-340 (Year: 2018).*

Paul, et al., "Approaches to abductive reasoning: an overview", Artificial intelligence review 7, 109-152, 1993 (Year: 1993).*

International Search Report for PCT Application No. PCT/JP2020/026660, mailed on Sep. 15, 2020.

Yutaka Matsuo et al., "Transformation of Cost-based Hypothetical Reasoning into Two Continuous Optimization Problems and a Reasoning Method with their Collaboration", Journal of the Japanese Society for Artificial Intelligence, vol. 16, Nov. 1, 2001, pp. 400-407.

JP Office Action for JP Application No. 2022-534550, mailed on Nov. 14, 2023 with English Translation.

* cited by examiner (GENERATION OF HYPOTHESIZED CANDIDATE)

(MATCHING WITH OBSERVED DATA)

(DETERMINATION OF BEST HYPOTHESIS)

(LEGEND)

(REDUCTION OF OBSERVATION)

(GENERATION OF HYPOTHESIZED CANDIDATE)

(MATCHING OF OBSERVED DATA)

(DETERMINATION OF BEST HYPOTHESIS)

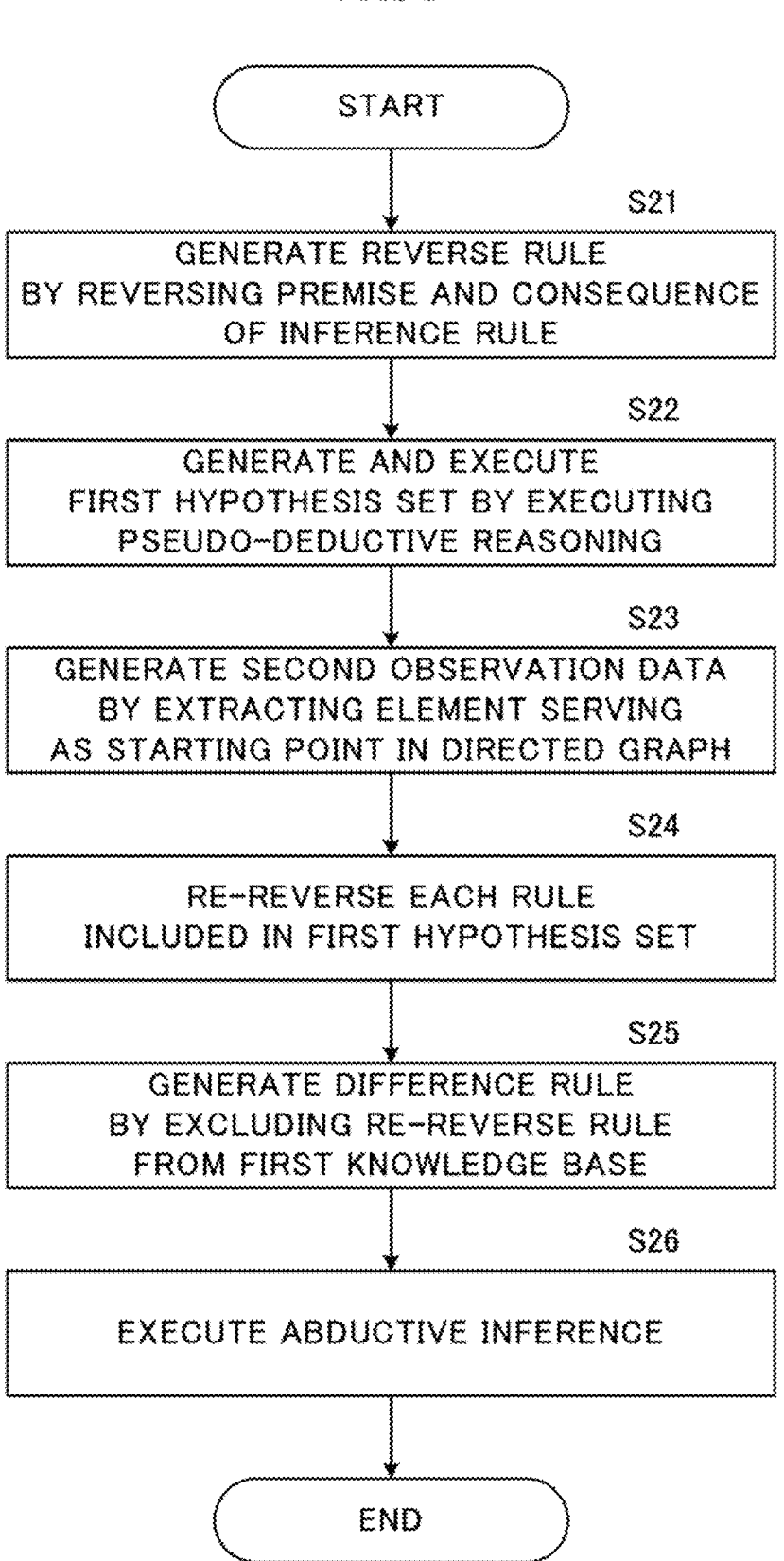

START

S21
GENERATE REVERSE RULE
BY REVERSING PREMISE AND CONSEQUENCE
OF INFERENCE RULE

S22
GENERATE AND EXECUTE
FIRST HYPOTHESIS SET BY EXECUTING
PSEUDO-DEDUCTIVE REASONING

S23
GENERATE SECOND OBSERVATION DATA
BY EXTRACTING ELEMENT SERVING
AS STARTING POINT IN DIRECTED GRAPH

S24
RE-REVERSE EACH RULE
INCLUDED IN FIRST HYPOTHESIS SET

S25
GENERATE DIFFERENCE RULE
BY EXCLUDING RE-REVERSE RULE
FROM FIRST KNOWLEDGE BASE

S26
EXECUTE ABDUCTIVE INFERENCE

END (INFERENCE RULE)

(OBSERVATION DATA)

(HYPOTHESIS GENERATION)

[HYPOTHESIS 1]

[HYPOTHESIS 2]

[HYPOTHESIS 3]

FIG. 11
(NEW OBSERVATION DATA)
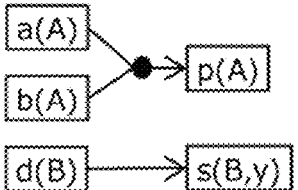
(HYPOTHESIS GENERATION)
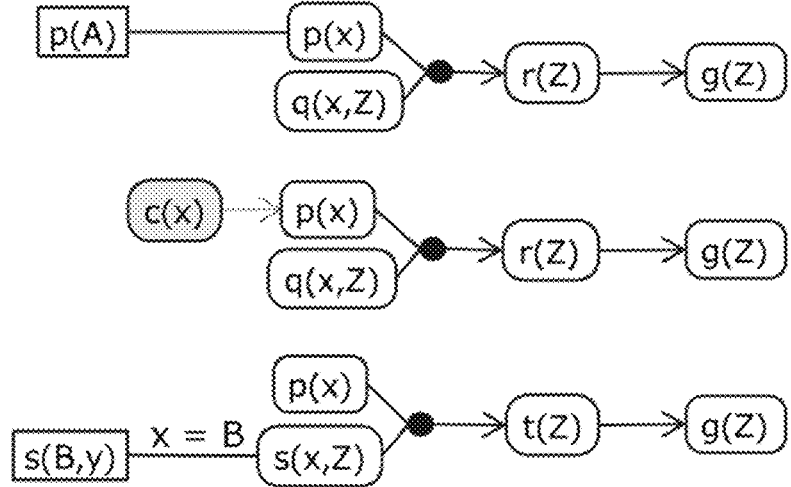

70

INFERENCE DEVICE, INFERENCE METHOD, AND RECORDING MEDIUM

This application is a National Stage Entry of PCT/JP2020/026660 filed on Jul. 8, 2020, the contents of all of which are incorporated herein by reference, in their entirety.

TECHNICAL FIELD

The present disclosure relates to a technology of an abductive inference.

BACKGROUND ART

An abductive inference is a technique to derive a reasonable hypothesis from inference knowledge (rules) given by logical formulas and observed events. For example, in a field of a cyber security, the abductive inference can be applied in a case of determining whether an event observed in a computer system is due to a cyber-attack. Although a backward inference is generally performed in the abductive inference, Patent Document 1 describes a technique for additionally generating a hypothesis which is not generated in the backward inference, by a forward inference. In addition, Patent Document 2 describes a technique to quickly determine the best hypothesis by converting candidates of the generated hypotheses into an integer programming problem (ILP: Integer Linear Programming Problem) or a satisfiability problem (SAT: Satisfiability Problem) in the abductive inference.

PRECEDING TECHNICAL REFERENCES

Patent Document

Patent Document 1: International Publication Pamphlet No. WO2018/229877

Patent Document 2: International Publication Pamphlet No. WO2020/003585

SUMMARY

Problem to be Solved by the Invention

As an amount of data (also called "observation data") representing observed events to be referred to and an amount of knowledge increase, the number of required inference processes increases exponentially, and it becomes difficult to complete an inference within an acceptable time and a memory capacity. In this regard, a technique of Patent Document 1 aims at improving a coverage of hypothesis candidates, and does not attempt to speed up the inference process. In addition, Patent Document 2 speeds up a process of determining the best hypothesis from generated hypothetical candidates, and does not speed up the generation of the hypothetical candidates.

It is one object of the present disclosure to provide an inference device capable of speeding up an abductive inference by speeding up the generation of the hypothetical candidates.

Means for Solving the Problem

According to an example aspect of the present disclosure, there is provided an inference device including:

an acquisition means configured to acquire first observation data and first knowledge base which is formed by a rule representing a pair of a premise and a consequence of the premise;

a rule conversion means configured to reverse the premise and the consequence of the rule forming the first knowledge base, and generate a second knowledge base formed by a rule deriving the premise from the consequence;

an inference execution means configured to execute an abductive inference using the second knowledge base and the first observation data, and generate a first hypothesis set represented by a directed graph; and a data extraction means configured to extract an element serving as a starting point in the directed graph representing the first hypothesis set, and generate second observation data, wherein the inference execution means executes the abductive inference by using the first knowledge base and the second observation data, and generates a second hypothesis set.

According to another example aspect of the present disclosure, there is provided a n inference method including:

acquiring first observation data and first knowledge base which is formed by a rule representing a pair of a premise and a consequence of the premise;

reversing the premise and the consequence of the rule forming the first knowledge base, and generate a second knowledge base formed by a rule deriving the premise from the consequence;

executing an abductive inference using the second knowledge base and the first observation data, and generate a first hypothesis set represented by a directed graph; and extracting an element serving as a starting point in the directed graph representing the first hypothesis set, and generating second observation data, wherein the abductive inference is executed by using the first knowledge base and the second observation data, and a second hypothesis set is generated.

According to a further example aspect of the present disclosure, there is provided a recording medium storing a program, the program causing a computer to perform a process including:

acquiring first observation data and first knowledge base which is formed by a rule representing a pair of a premise and a consequence of the premise;

reversing the premise and the consequence of the rule forming the first knowledge base, and generate a second knowledge base formed by a rule deriving the premise from the consequence;

executing an abductive inference using the second knowledge base and the first observation data, and generate a first hypothesis set represented by a directed graph; and extracting an element serving as a starting point in the directed graph representing the first hypothesis set, and generating second observation data, wherein the abductive inference is executed by using the first knowledge base and the second observation data, and a second hypothesis set is generated.

Effect of the Invention

According to the present disclosure, it becomes possible to provide an inference device capable of speeding up an abductive inference by speeding up generation of hypothesis candidates.

BRIEF DESCRIPTION OF THE DRAWINGS

FIG. 8 is a flowchart of an inference process by the inference device of the second example embodiment.

FIG. 11 illustrates an example of a case where a hypothesis is generated by the abductive inference of the second example embodiment.

EXAMPLE EMBODIMENTS

In the following, example embodiments will be described with reference to the accompanying drawings.

Basic Principle

An abductive inference is basically realized in a two-step process: a generation process of a candidate set of hypotheses and a decision process of the best hypothesis from the candidate set. In this two-step process, the following example embodiments speed up the generation process of the candidate set of hypotheses. In detail, an inference device of each example embodiment generates knowledge obtained by reversing a premise and a consequence of the knowledge for the abductive inference, and from this knowledge and observation data, and generates new observation data summarized and abstracted by performing a pseudo-deductive reasoning in a predetermined range using the abductive inference. Next, the inference device performs the abductive inference using the generated new observation data. Therefore, the inference device acquires a deductive consequence without forming a hypothesis within a range in which a proposition is established by observation data, so as to be possible to suppress an amount of observation data and an amount of knowledge to be targeted, to generate the candidate set of hypotheses in a shorter time, and to determine the best hypothesis. This makes it possible for the inference device to generate the candidate set of hypotheses in a shorter time and determine the best hypotheses by suppressing the amount of observation data and the amount of knowledge that should be targeted, in the range where propositions are established by observation data, by deductively obtaining the consequences without making a hypothesis. In this method, since the observation data, the knowledge, and an inference section used are the same as those in a general abductive inference, an operational cost does not increase compared to the general abductive inference.

Figure 1A:
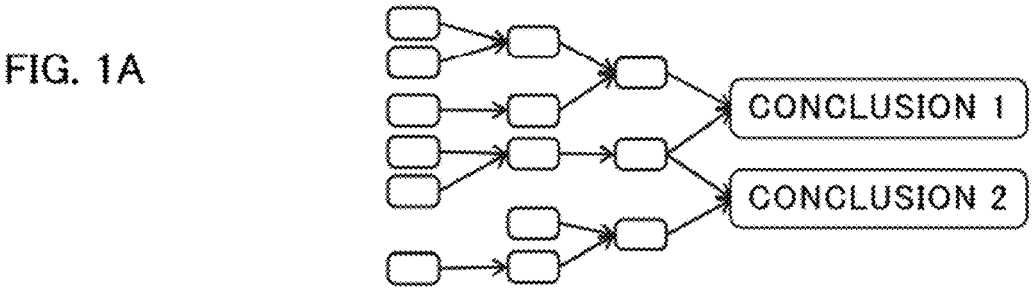
FIG. 1A through FIG. 1D schematically illustrate a method of a general abductive inference.
Figure 1B:
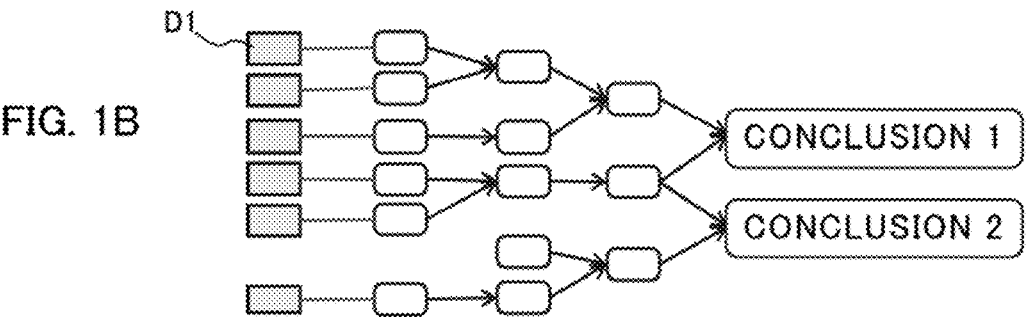
Figure 1C:
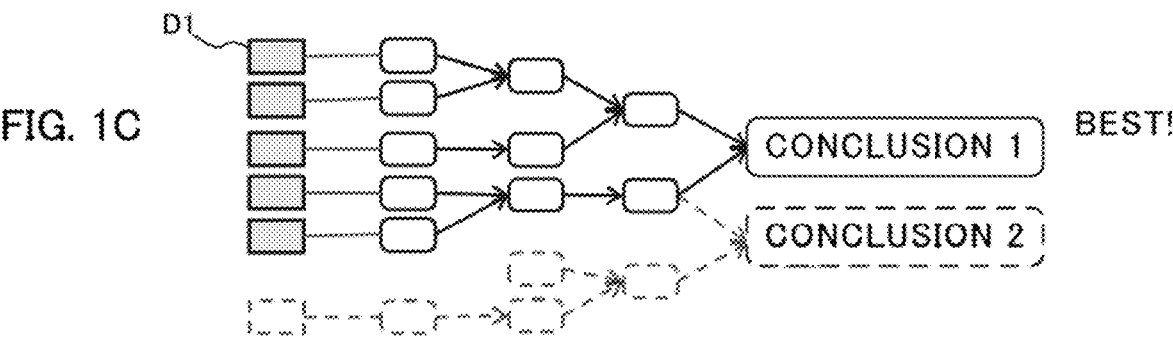
Figure 1D:
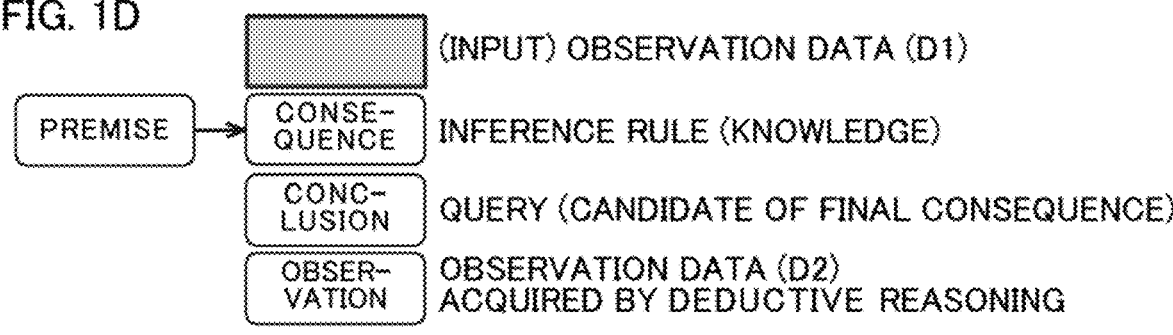

FIG. 1A to FIG. 1C schematically illustrate a general abductive inference method. FIG. 1A to FIG. 1C illustrate graphs conceptually representing hypothetical candidates at respective stages of the abductive inference, and FIG. 1D illustrates a legend of each graph. In the legend, "observation data" are data that indicate an actually observed event. An "inference rule (knowledge)" is a pair of a premise and a corresponding consequence. A "conclusion" is a query of the abductive inference. An example of the methods for realizing the abductive inference as described above is Open-David (https://github.com/aurtg/open-david)).

In the general abductive inference, first, as illustrated in FIG. 1A, an inference section generates hypothetical candidates from conclusions (queries) using inference rules (knowledge) acquired in advance. Next, the inference section applies respective sets of actually acquired first observation data D1 at corresponding positions in the generated hypothetical candidates, as illustrated in FIG. 1B, and matches the hypothetical candidates with respective sets of the observation data. Accordingly, the inference section determines the best hypothesis from among a plurality of hypothetical candidates as illustrated in FIG. 1C. In this manner, in the general abductive inference, a set of hypothetical candidates (also called a "latent hypothesis set") covering all conceivable possibilities is generated within a range of knowledge related to the observation data, and the best hypothesis is determined based on a predetermined index from the latent hypothesis set. Accordingly, the larger the amount of observation data and knowledge, the larger the latent hypothesis set to be generated, and the greater the amount of processing required to generate the latent hypothesis set and to determine the best hypothesis from the latent hypothesis set.

Figure 2A:
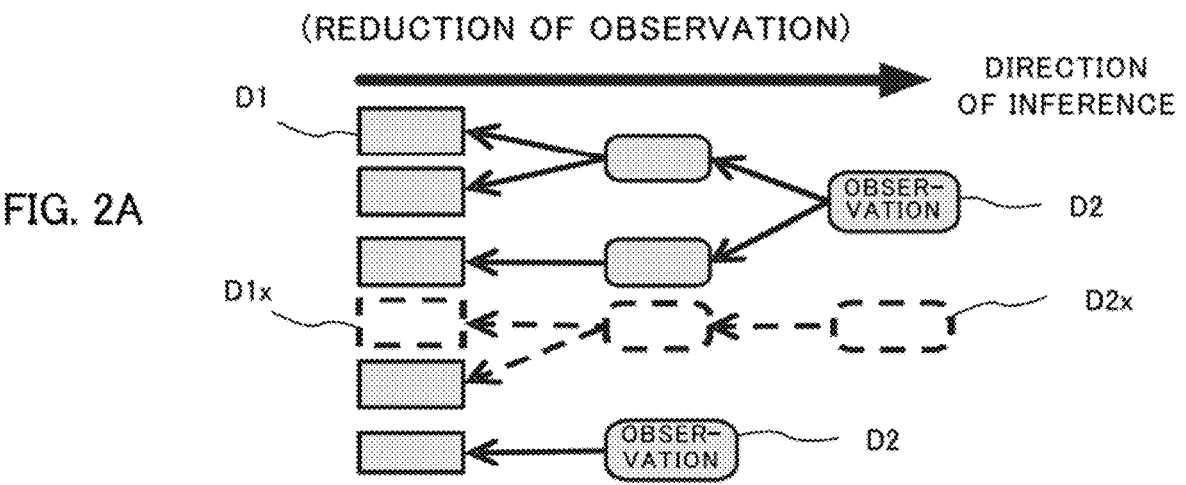
FIG. 2A through FIG. 2D schematically illustrate a method of an abductive inference of example embodiments.

FIG. 2A to FIG. 2D schematically illustrate a method of the abductive inference of the example embodiments. FIG. 2A to FIG. 2D are diagrams conceptually representing the hypothetical candidates at each stage of the abductive inference, and notations follow the legend illustrated in FIG. 1D. In the technique of the example embodiments, in a range in which a proposition is established by observation data, the amount of observation data and knowledge which the abductive inference targets are reduced by acquiring a consequence deductively without making a hypothesis. In detail, as illustrated in FIG. 2A, the inference section inverts the premise and the consequence of the inference rule (illustrated by each right arrow in FIG. 1A to FIG. 1C used in the general abductive inference, and generates a backward rule (illustrated by each left arrow in FIG. 2A, and hereinafter, also called a "reverse rule"). Next, the inference section performs the abductive inference using the first observation data D1 and the reverse rule to generate second observation data D2. By performing the abductive inference using the reverse rule, the inference section will perform a deductive reasoning in a pseudo-manner. Here, as illustrated in FIG. 2A, in a case where observation data D1$x$ that are a part of the first observation data D1 are missing, some propositions will not hold due to a lack of premises at a time of performing a pseudo-deductive reasoning, and a subsequent inference process which derives observation data D2$x$ becomes unnecessary. As a result, in a range in which the propositions are established by the observation data, a processing time can be shortened more than that in the same range by performing the pseudo-deductive reasoning.

Figure 2B:
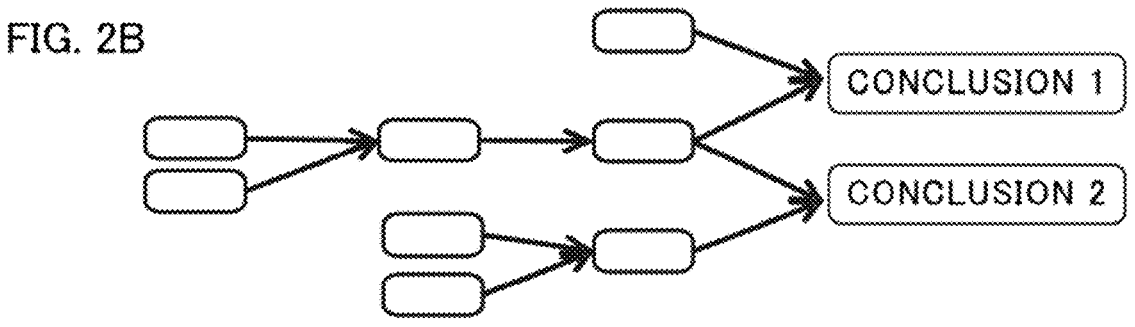

Next, the inference section performs the abductive inference by excluding an inference rule included in a result from the above-described pseudo-deductive reasoning, as illustrated in FIG. 2B. As described above, in a case where the abductive inference is not performed in the range of the deductive reasoning, it is possible to reduce time necessary to generate the latent hypothesis set. Also, as can be understood when comparing FIG. 1A with FIG. 2B, the latent hypothesis set generated here has a simple configuration because the range subject to the above-described pseudo-deductive reasoning is not included.

Figure 2C:
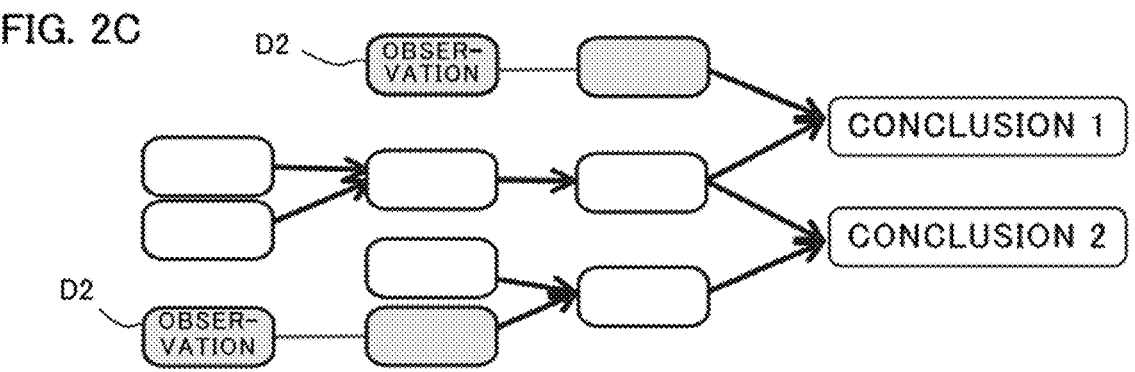
Figure 2D:
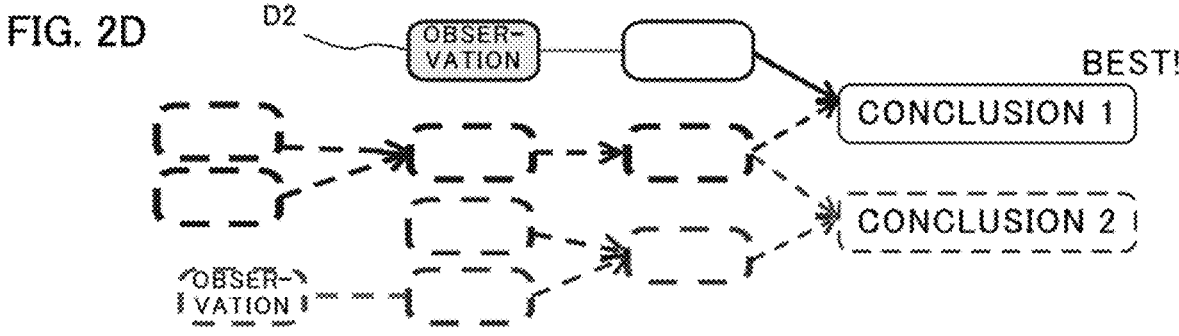

After that, the inference section performs the general abductive inference using the obtained latent hypothesis set. That is, as illustrated in FIG. 2C, the inference section applies the second observation data D2, which are generated by the above-described pseudo-deductive reasoning, at the corresponding position in the latent hypothesis set, and determines the best hypothesis in the latent hypothesis set as illustrated in FIG. 2D.

As described above, the abductive inference of the example embodiment speeds up the inference of the range by generating the reverse rule and performing the pseudo-deductive reasoning in the range in which the proposition is established by the observation data. In addition, since the latent hypothesis set is generated by excluding the range where the pseudo-deductive reasoning is performed, and the best hypothesis is determined by using the observed data obtained by the deductive reasoning, the size of the latent hypothesis set can be reduced compared with a case where the general abductive inference is performed for all sets of observed data and knowledge. As a result, is possible to shorten the processing time of the abductive inference.

First Example Embodiment

[Hardware Configuration]

Figure 3:
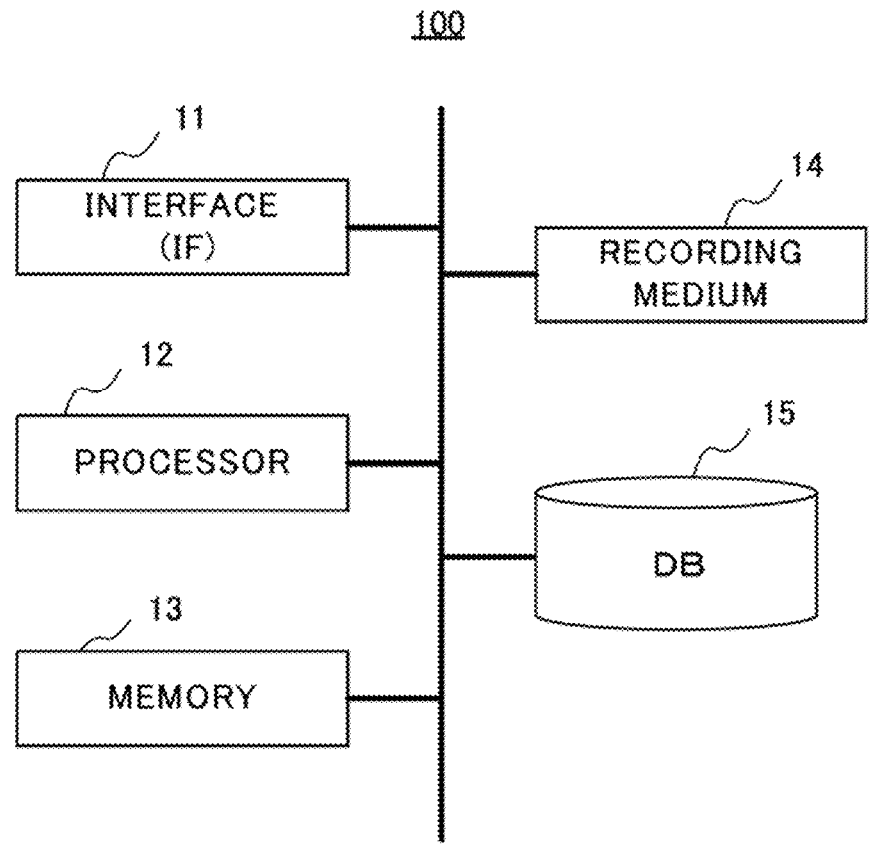
FIG. 3 is a block diagram illustrating a hardware configuration of an inference device.

FIG. 3 is a block diagram illustrating a hardware configuration of an inference device 100. As illustrated, the inference device 100 includes an interface (IF) 11, a processor 12, a memory 13, a recording medium 14, and a database (DB) 15.

The IF 11 inputs and outputs data to and from an external device. In detail, the observation data and knowledge used in the inference are input through the IF 11. An inference result by the inference device 100 is output to the external device through the IF 11.

The processor 12 corresponds to one or more processors each being a computer such as a CPU (Central Processing Unit) or a GPU (Graphics Processing Unit), and controls the entire inference device 100 by executing programs prepared in advance. Specifically, the processor 12 performs the inference process which will be described later.

The memory 13 is formed by a ROM (Read Only Memory) and a RAM (Random Access Memory). The memory 13 is also used as a working memory during various processes executed by the processor 12.

The recording medium 14 is a non-volatile and non-transitory recording medium such as a disk-like recording medium or a semiconductor memory and is formed to be detachable to the inference device 100. The recording medium 14 records various programs executed by the processor 12. When the inference device 100 performs various processes, the programs recorded in the recording medium 14 are loaded into the memory 13 and executed by the processor 12.

The database 15 stores the observation data, a knowledge base, and the like which are input through the IF 11. The database 15 also stores the observation data and the knowledge base generated in the inference process of the present example embodiment. Note that both the observation data and the knowledge base may be temporarily stored in the memory 13, and the database 15 may not be used, or the database 15 may be used as a storage for storing partial data.

[Functional Configuration]

Figure 4:
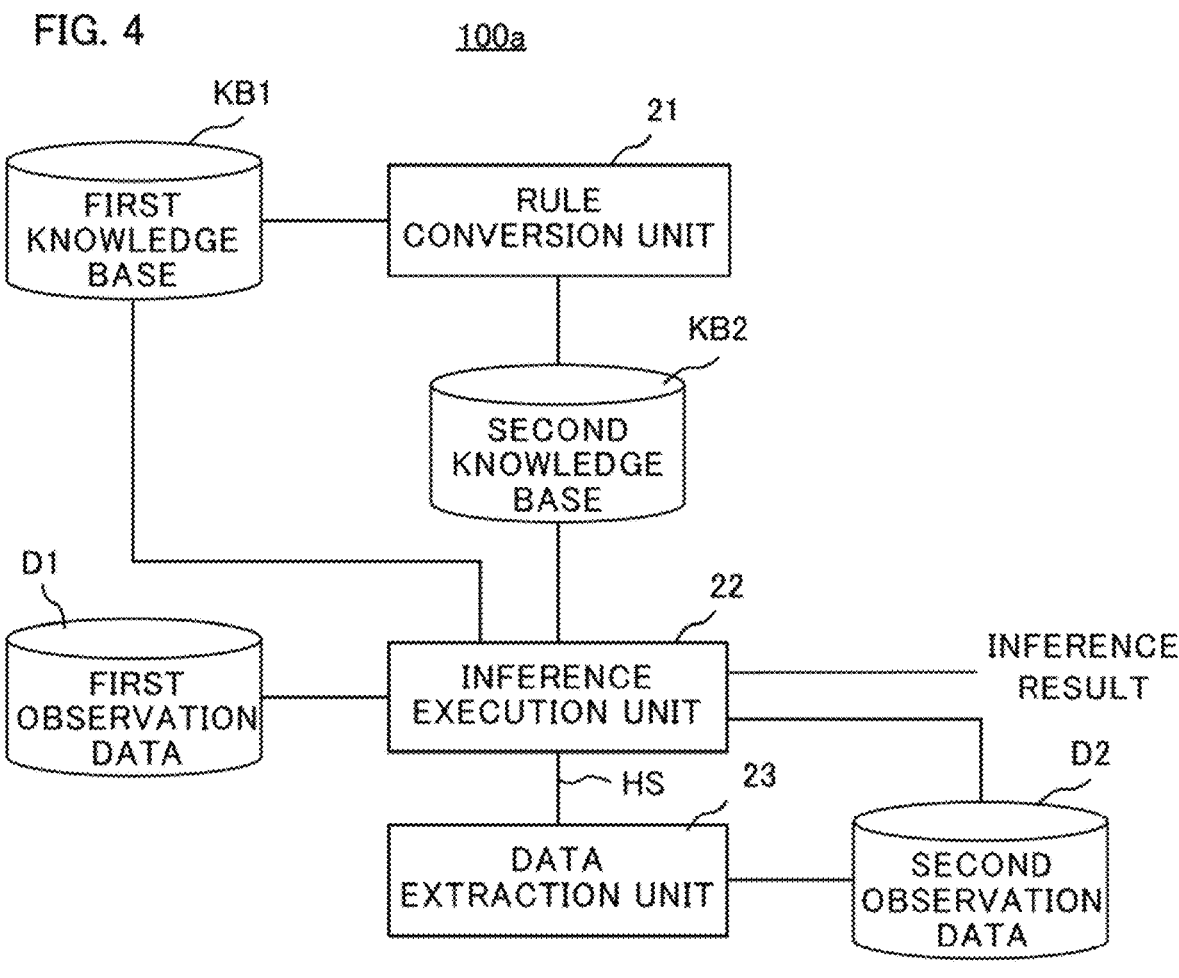
FIG. 4 is a block diagram illustrating a functional configuration of the inference device according to a first example embodiment.

FIG. 4 is a block diagram illustrating a functional configuration of an inference device 100$a$ according to the first example embodiment. The inference device 100$a$ includes a rule conversion unit 21, an inference execution unit 22, and a data extraction unit 23.

A first knowledge base KB1 prepared in advance is input into the rule conversion unit 21. The first knowledge base KB1 stores the inference rule for the abductive inference. The rule conversion unit 21 reverses the premise and the consequence in the inference rule forming the first knowledge base KB1, and generates a rule that derives the premise from the consequence, that is, a second knowledge base KB2 formed by the reverse rule. The second knowledge base KB2 is a knowledge base for the above described pseudo-deductive reasoning.

The inference execution unit 22 performs the abductive inference using the second knowledge base KB2 and the first observation data D1, and generates the latent hypothesis set (hereafter, called a "first hypothesis set") HS represented by a directed graph. Here, the inference execution unit 22 performs the pseudo-deductive reasoning by performing the abductive inference of the first observation data D1 using the reverse rule.

Figure 5:
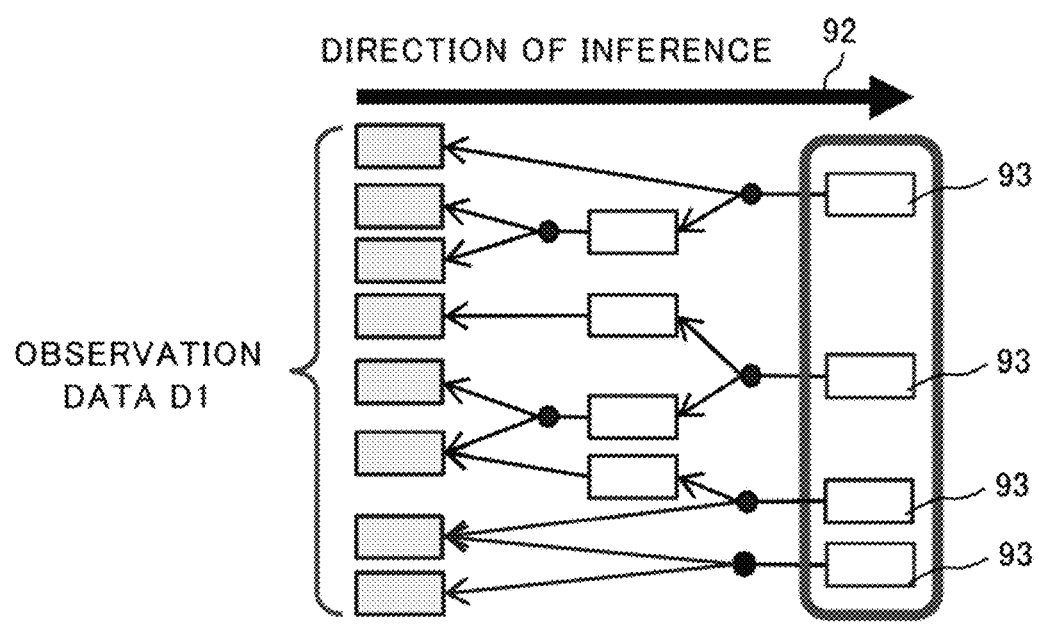
FIG. 5 conceptually illustrates a first hypothesis set being generated.

FIG. 5 conceptually illustrates the generated first hypothetical set HS. In FIG. 5, each inference rule becomes the reverse rule indicated by a leftward arrow as in FIG. 2A. The inference execution unit 22 performs the abductive inference in a direction indicated by an arrow 92 from the first observation D1 using the reverse rule. Note that, since the first hypothesis set is created to obtain the second observation data D2, the process for determining the best hypothesis from the first hypothesis set is not necessary.

The data extraction unit 23 extracts all elements 93 serving as starting points based on the directed graph representing the first hypothesis set HS, and determines the second observation data D2 by the extracted elements 93. After that, the inference execution unit 22 executes the abductive inference using the first knowledge base KB1 and the second observation data D2, and generates an inference result. That is, the inference execution unit 22 generates a new latent hypothesis set (hereinafter, referred to as a "second hypothesis set"), determines the best hypothesis from the second hypothesis set, and outputs the determined best hypothesis as the inference result.

As described above, since the inference device 100$a$ generates the second observation data D2 by performing the pseudo-deductive inference using the reverse rule for a part of the first observation data D1 that is a subject of the abductive inference, and performs the abductive inference using the second observation data D2, it is possible to acquire the inference result with higher speed than a case of performing the abductive inference with respect to the entire first observation data D1.

[Inference Process]

Figure 6:
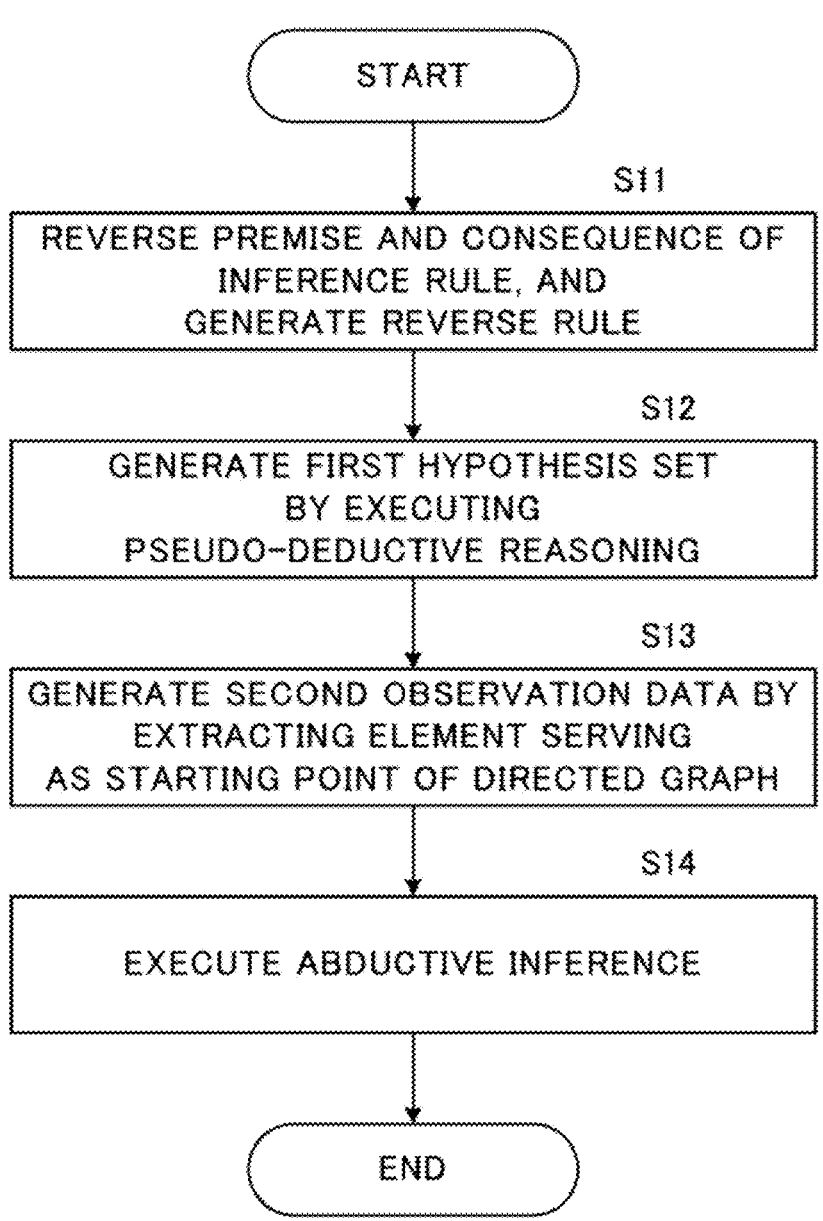
FIG. 6 is a flowchart of an inference process by the inference device of the first example embodiment.

FIG. 6 is a flowchart of the inference process that is performed by the inference device 100*a* according to the first example embodiment. This inference process is realized by the processor 12 depicted in FIG. 3, which executes a program prepared in advance and operates as each element depicted in FIG. 4.

First, the rule conversion unit 21 generates a reverse rule by inverting the premise and the consequence in each inference rule in the first knowledge base KB1, and generates the second knowledge base KB2 (step S11). Next, the inference execution unit 22 executes the pseudo-deductive reasoning using the first observation data and the generated reverse rules to generate the first hypothesis set HS (step S12). Next, in the first hypothesis set HS depicted in FIG. 5, the data extraction unit 23 extracts each element serving as a starting point in the directed graph, and generates the second observation data D2 (step S13). After that, the inference execution unit 22 executes the abductive inference using the first knowledge base and the second observation data, and generates the inference result (step S14). Accordingly, the inference process is terminated.

Second Example Embodiment

Next, a second example embodiment of the present invention will be described. A hardware configuration of the inference device according to the second example embodiment is the same as that of the first example embodiment depicted in FIG. 3, and thus explanations thereof will be omitted.

[Functional Configuration]

Figure 7:
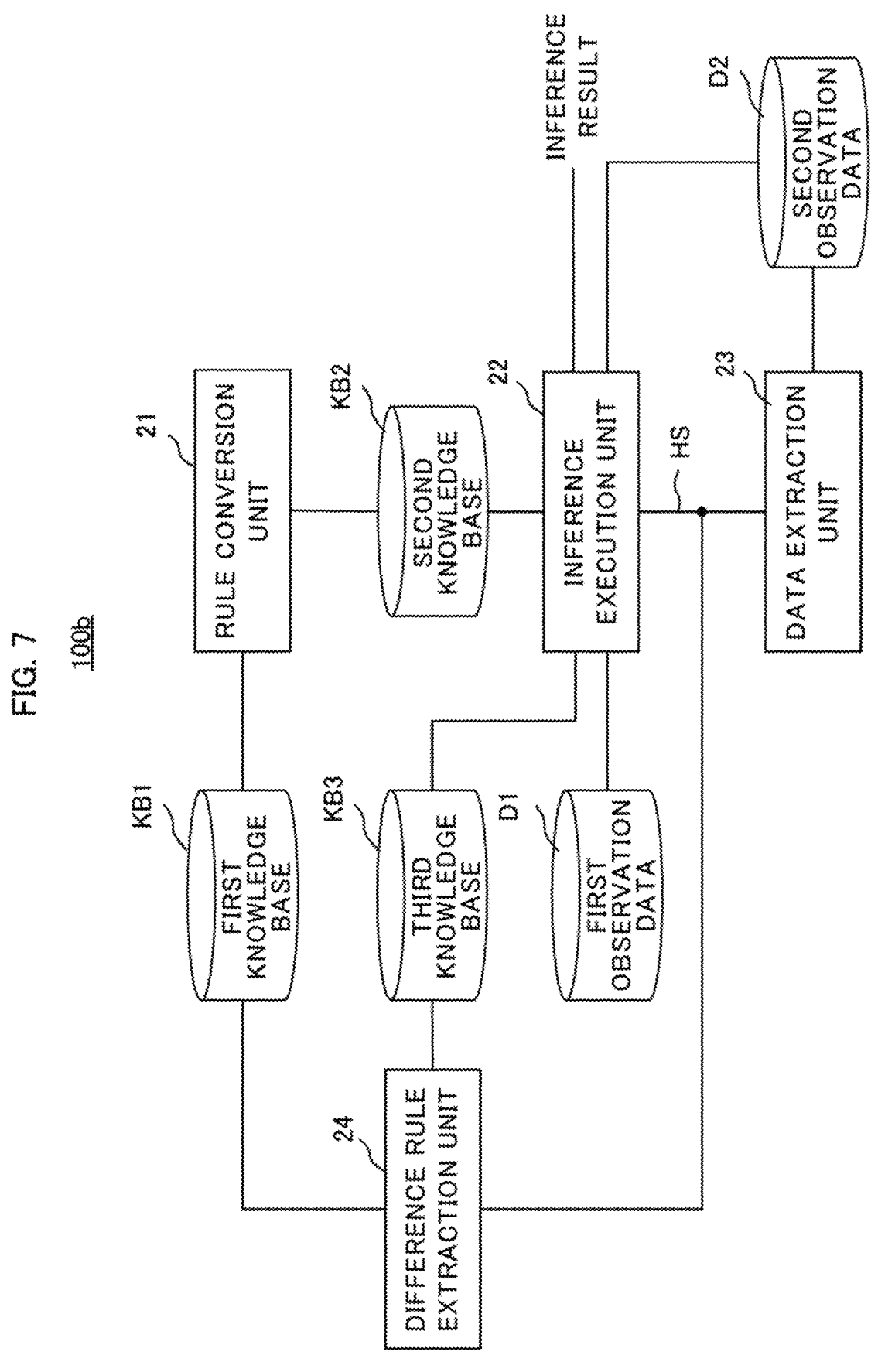
FIG. 7 is a block diagram illustrating a functional configuration of an inference device according to a second example embodiment.

FIG. 7 is a block diagram illustrating a functional configuration of an inference device 100*b* according to the second example embodiment. The inference device 100*b* includes the rule conversion unit 21, an inference execution unit 22, the data extraction unit 23, and a difference rule extraction unit 24. Here, the rule conversion unit 21 and the data extraction unit 23 are the same as those of the inference device 100*a* in the first example embodiment, and operate in the same manner as described in the first example embodiment.

The difference rule extraction unit 24 extracts all reverse rules included in the first hypothesis set HS, and generates rules acquired by re-reversing the extracted reverse rules (hereinafter, also referred to as "re-reverse rules"). After that, the difference rule extraction unit 24 generates a third knowledge base KB3 formed by a rule of each difference (hereinafter, also referred to as a "difference rule") in which the re-reverse rule is excluded from the first knowledge base KB1, and outputs the third knowledge base KB3 to the inference execution unit 22.

The inference execution unit 22 executes the abductive inference using the third knowledge base KB3 and the second observation data D2 generated by the data extraction unit 23, and generates the inference result. That is, the inference execution unit 22 generates the second hypothesis set, determines the best hypothesis from the second hypothesis set, and outputs the second hypothesis set as the inference result.

The inference device 100*b* of the second example embodiment determines, as the third knowledge base KB3, difference rules excluding each re-reverse rule from among the inference rules of the first knowledge base KB1, and performs the abductive inference using the inference rules being the difference rules. In other words, the inference device 100*b* excludes, from subjects to the abductive inference, each inference rule used by the inference execution unit 22 as the reverse rule in the pseudo-deductive inference within the first knowledge base KB1, and performs the abductive inference only for remaining inference rules. Accordingly, it becomes possible to reduce the inference rules as the subjects for which the inference execution unit 22 performs the abductive inference, and to reduce a processing load and a processing time.

[Inference Process]

FIG. 8 is a flowchart of the inference process that is performed by the inference device 100*b* according to the second example embodiment. This inference process is realized by the processor 12 depicted in FIG. 3, which executes a program prepared in advanced and operates as each element depicted in FIG. 4.

Since steps S21 to S23 are the same as steps S11 to S13 of the inference process of the first example embodiment illustrated in FIG. 8, the explanations thereof will be omitted. In step S24, the difference rule extraction unit 24 generates the re-reverse rule by re-revering the reverse rule included in the first hypothesis set HS. Next, the difference rule extraction unit 24 generates difference rules by excluding each re-reverse rule from the first knowledge base KB1, and determines the generated difference rules as the third knowledge base KB3 (step S25).

Next, the inference execution unit 22 executes the abductive inference using the third knowledge base KB3 generated in step S25 and the second observation data generated in step S23, and generates the inference result (step S26). After that, the inference process is terminated.

[Concrete Example]

Figure 9:
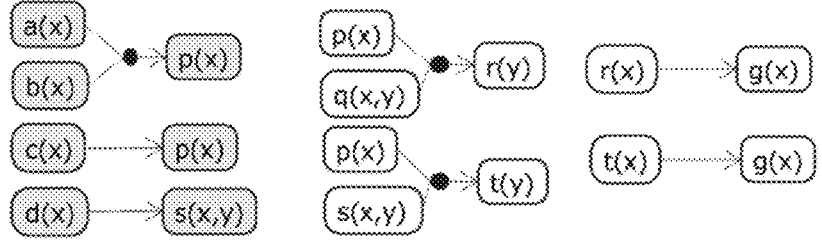
FIG. 9 illustrates an inference rule and an observation data in a detailed example of an abductive inference.

Next, a concrete example of the abductive inference will be described according to the present example embodiment. It is assumed that there are the inference rules (knowledge) and the observation data depicted in FIG. 9. The inference rules are illustrated by logical formulas and are related to $a(x)$, $b(x)$, $c(x)$, $d(x)$, $p(x)$, $q(x,y)$, $r(y)$, $s(x,y)$, $t(y)$, $r(x)$, and $g(x)$. The inference rule includes, for inference, "if $a(x)$ and $b(x)$ are established, $p(x)$ is established", "if $c(x)$ is established, $p(x)$ is established", and the like. On the other hand, the observed data are represented by $a(A)$, $b(A)$, and $d(B)$.

Figure 10:
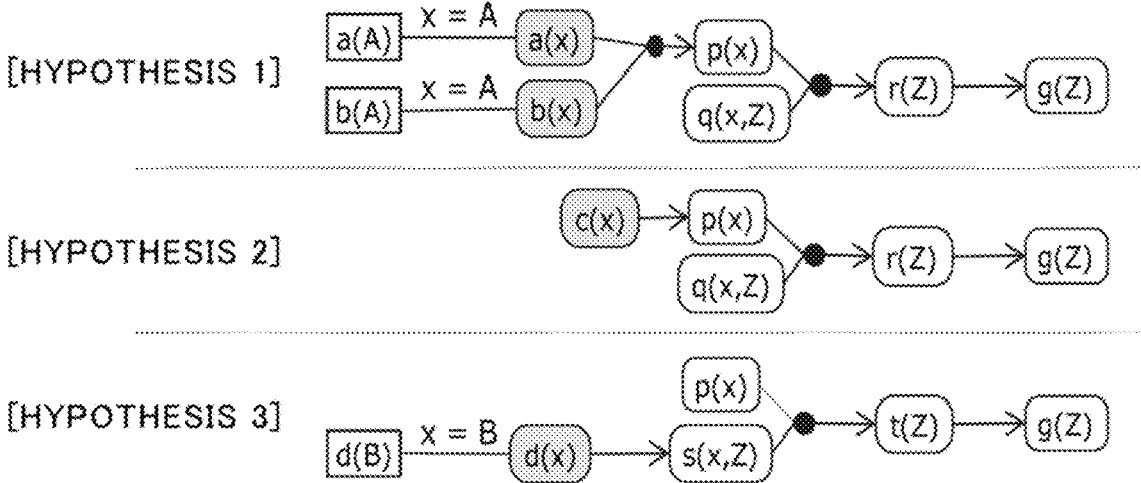
FIG. 10 illustrates an example of a case where a hypothesis is generated by the general abductive inference.

FIG. 10 illustrates an example of generating a hypothesis that holds a conclusion $g(Z)$ using general abductive inference. Note that in FIG. 10, candidate hypotheses 1 to 3 that can be the best hypotheses are listed at the same time for convenience of explanations. As illustrated, the hypotheses 1 to 3 are generated from the conclusion $g(Z)$ and the observation data are applied to determine the best hypothesis. In the general abductive inference, it is necessary to generate a directed graph of hypotheses that connect to individual sets of observation data using all knowledge and inference rules, resulting in high computational costs.

FIG. 11A and FIG. 11B illustrate examples of generating each hypothesis that holds the conclusion $g(Z)$ using the abductive inference of the second example embodiment. In a method of the present example embodiment, the inference device 100*b* generates new sets of observation data $p(A)$ and $(B,y)$ as depicted in FIG. 11A by the pseudo-deductive reasoning in which the reverse rule obtained by reversing the inference rule is forwardly applied. Moreover, since the inference device 100*b* generates each hypothesis candidate using a difference rule in which the re-reverse rule is excluded from the first knowledge base, hypothesis candidates are acquired with a small scale as compared with a case of performing the general hypothesis inference as depicted in FIG. 11B. Next, the inference device 100*b* performs the abductive inference using small scale hypothetical candidates and the new sets of observation data p(A) and s(B,y), so that a computational cost can be reduced and the processing time can be reduced.

Third Example Embodiment

Next, a third example embodiment will be described in the present disclosure. A hardware configuration of an inference device according to the third example embodiment is the same as that of the first example embodiment depicted in FIG. 3, and thus explanations thereof will be omitted.

Functional Configuration

Figure 12:
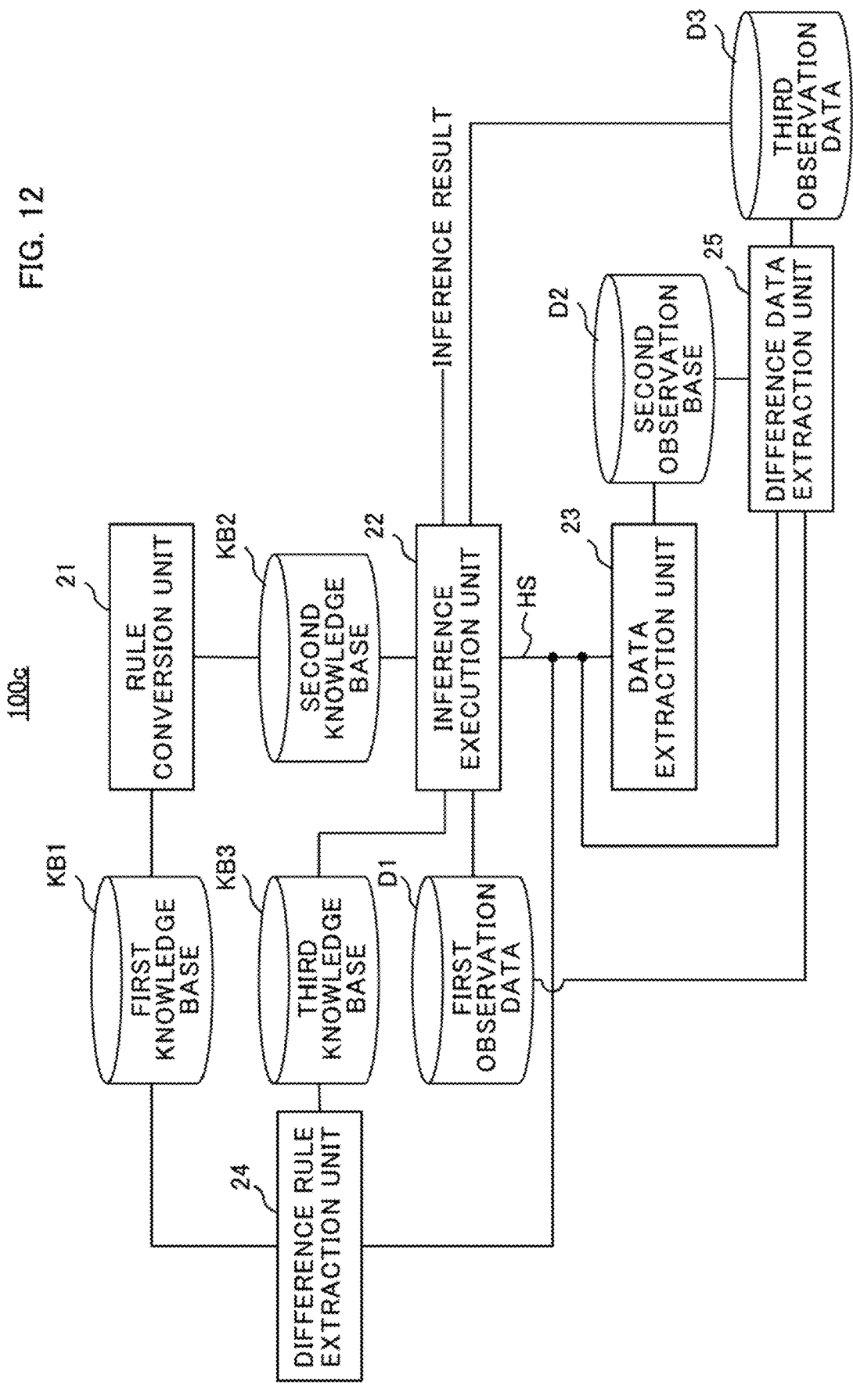
FIG. 12 is a block diagram illustrating a functional configuration of an inference device according to a third example embodiment.

FIG. 12 is a block diagram illustrating a functional configuration of an inference device 100c according to the third example embodiment. The inference device 100c includes the rule conversion unit 21, an inference execution unit 22, the data extraction unit 23, the difference rule extraction unit 24, and a difference data extraction unit 25. Here, the rule conversion unit 21, the data extraction unit 23, and the difference rule extraction unit 24 are the same as those of the inference device 100b of the second example embodiment, and operate in the same manner.

Among sets of the first observation data D1, the difference data extraction unit 25 extracts the observation data (hereinafter, also referred to as "difference data") not included in the directed graph of the first hypothesis set HS, and outputs the difference data as the third observation data D3 by integrating the difference data with the second observation data D2 to the inference execution unit 22.

The inference execution unit 22 executes the abductive inference using the third knowledge base KB3 and the third observation data D3 generated by the difference data extraction unit 25, and generates the inference result. That is, the inference execution unit 22 generates the second hypothesis set, determines the best hypothesis from the second hypothesis set, and outputs the best hypothesis as the inference result.

According to the inference device 100c of the third example embodiment, among the first observation data D1, the observation data not included in the first hypothetical set HS is extracted as the difference data, and the difference data are added to the subject of the abductive inference by the inference execution unit 22. Therefore, in comparison with the first example embodiment and the second example embodiment in which only the second observation data D2 are the subject of the abductive inference, it is possible to perform the abductive inference with high accuracy in consideration with all observation data including the difference data.

[Inference Process]

Figure 13:
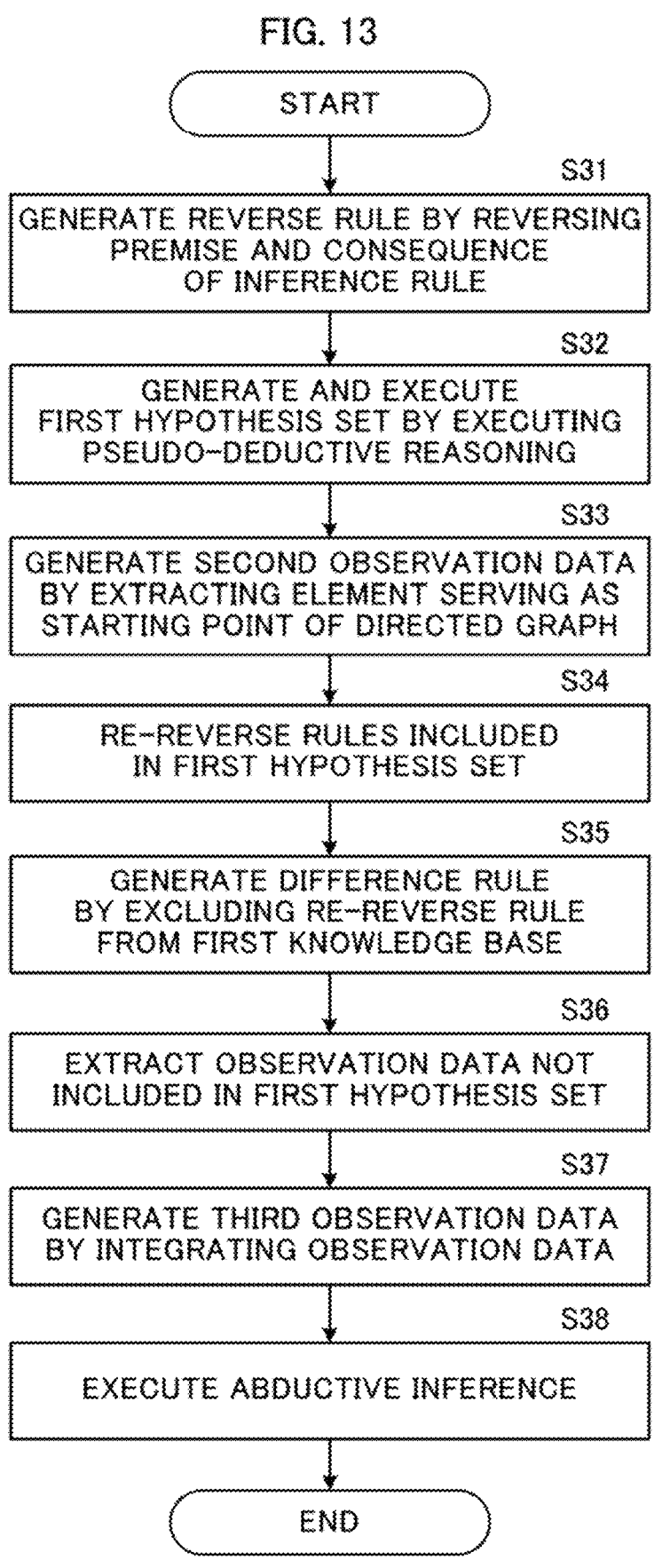
FIG. 13 is a flowchart of an inference process by the inference device of the third example embodiment.

FIG. 13 is a flowchart of the inference process that is performed by the inference device 100c according to the third example embodiment. This inference process is realized by the processor 12 depicted in FIG. 3, which executes a program prepared in advance and operates as each element depicted in FIG. 4.

Since steps S31 to S35 are the same as steps S21 to S25 of the inference process of the second example embodiment depicted in FIG. 8, the explanations thereof will be omitted. In step S36, the difference data extraction unit 25 extracts the observation data not included in the first hypothesis set HS, as difference data from sets of the first observation data D1. Next, the difference data extraction unit 25 generates the third observation data D3 by integrating the difference data with the second observation data D2 (step S37).

Next, the inference execution unit 22 executes the abductive inference using the third knowledge base KB3 generated in step S35 and the third observed data D3 generated in step S37, and generates the inference result (step S38). After that, the inference process is terminated.

[Modification]

Although the above-described third example embodiment has a configuration in which the difference data extraction unit 25 is added to the inference device 100b of the second example embodiment, instead, the third example embodiment may have a configuration in which the difference data extraction unit 25 is added to the inference device 100a of the first example embodiment.

Fourth Example Embodiment

Figure 14:
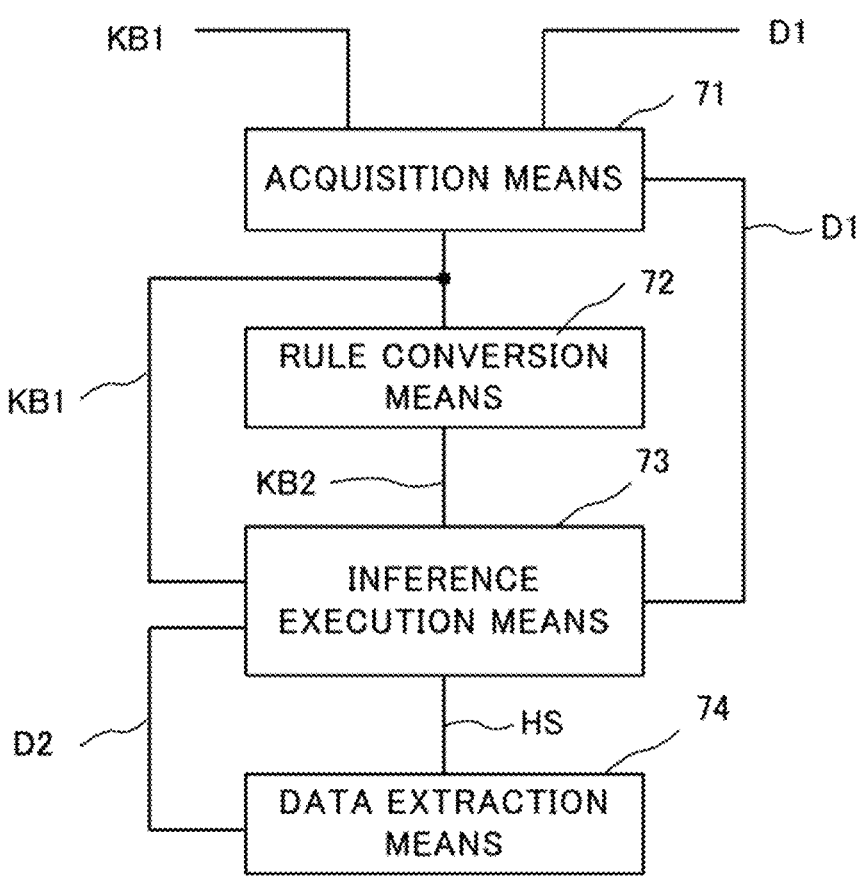
FIG. 14 is a block diagram illustrating a functional configuration of an inference device according to a fourth example embodiment.

Next, a fourth example embodiment of the present invention will be described. FIG. 14 is a block diagram illustrating a functional configuration of an inference device 70 according to the fourth example embodiment. The inference device 70 includes an acquisition means 71, a rule conversion means 72, an inference execution means 73, and a data extraction means 74.

Figure 15:
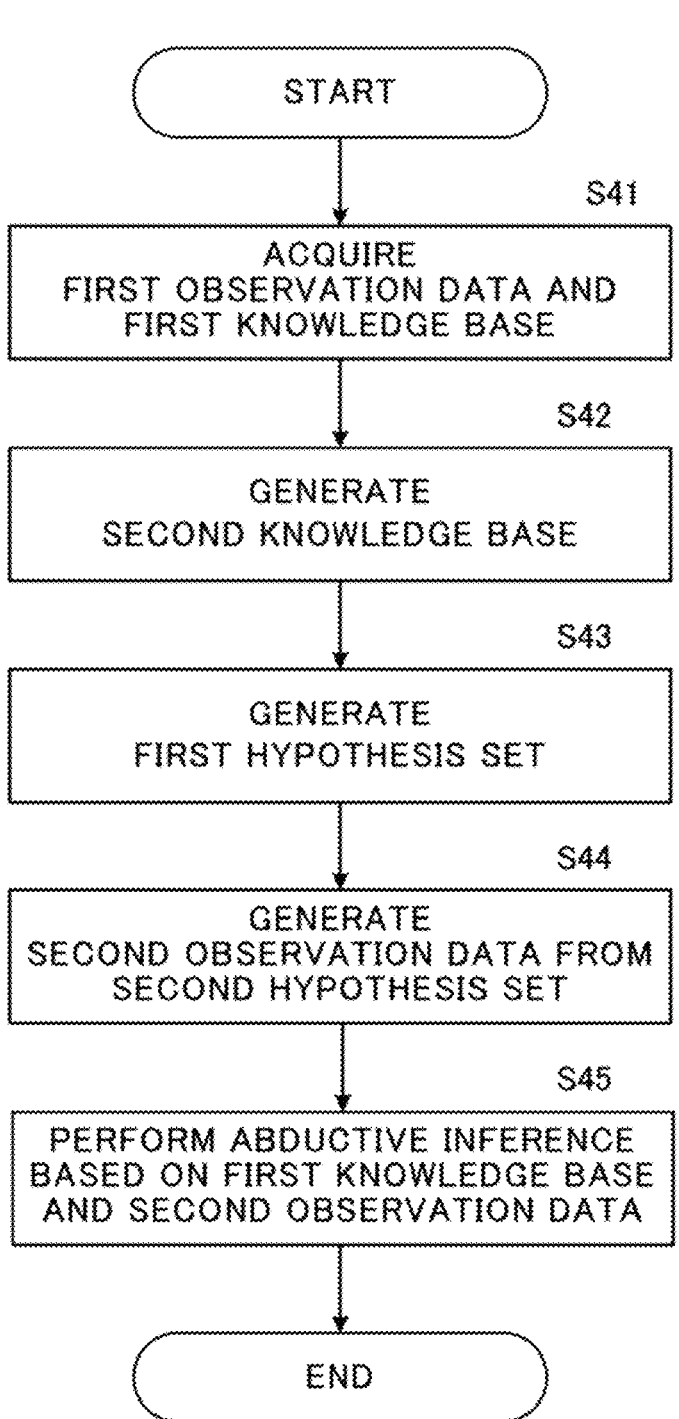
FIG. 15 is a flowchart of an inference process by the inference device of the fourth example embodiment.

FIG. 15 is a flowchart of an inference process performed by the inference device according to the fourth example embodiment. The acquisition means 71 acquires the first observation data D1 and the first knowledge base KB1 which is formed by rules each representing a pair of the premise and the consequence of the premise (step S41). The rule conversion means 72 reverses the premise and the consequence of the rule forming the first knowledge base KB1, and generates the second knowledge base KB2 formed by rules each deriving the premise from the consequence (step S42). The inference execution means 73 performs the abductive inference using the second knowledge base KB2 and the first observation data D1, and generates the first hypothesis set HS expressed by the directed graph (step S43).

The data extraction means 74 extracts each element serving as a starting point from the directed graph representing the first hypothesis set HS, and generates the second observation data D2 (step S44). Then, the inference execution means 73 performs the abductive inference using the first knowledge base KB1 and the second observation data D2, and generates the second hypothesis set (step S45).

According to the inference device 70 of the fourth example embodiment, for a part of the first observation data D1 to be a subject to the abductive inference, the second observation data D2 are generated by performing the pseudo-deductive reasoning using the reverse rules, and the abductive inference is performed using the second observation data D2, so that the inference result can be obtained with high speed as compared to a case where the abductive inference is performed for the whole of the first observation data D1.

A part or all of the example embodiments described above may also be described as the following supplementary notes, but not limited thereto.

Supplementary Note 1

1. An inference device comprising:
   an acquisition means configured to acquire first observation data and first knowledge base which is formed by a rule representing a pair of a premise and a consequence of the premise;

a rule conversion means configured to reverse the premise and the consequence of the rule forming the first knowledge base, and generate a second knowledge base formed by a rule deriving the premise from the consequence;

an inference execution means configured to execute an abductive inference using the second knowledge base and the first observation data, and generate a first hypothesis set represented by a directed graph; and a data extraction means configured to extract an element serving as a starting point in the directed graph representing the first hypothesis set, and generate second observation data, wherein the inference execution means executes the abductive inference by using the first knowledge base and the second observation data, and generates a second hypothesis set.

Supplementary Note 2

2. The inference device according to supplementary note 1, further comprising a difference rule extraction means configured to generate a third knowledge base formed by a rule of a difference in excluding a rule formed by a pair of the premise and the consequence from the first knowledge base, in which the rule formed by the pair is acquired by re-reversing a portion corresponding to a rule deriving the premise from the consequence within the first hypothesis set, wherein the inference execution means executes the abductive inference using the third knowledge base and the second observation data, and generates the second hypothesis set.

Supplementary Note 3

3. The inference device according to supplementary note 2, further comprising a difference data extraction means configured to extract observation data not included in the directed graph of the first hypothesis set in the first observation data, and generates third observation data by integrating the extracted data with the second observation data, wherein the inference execution means executes the abductive inference using the first knowledge base and the third observation data, and generates the second hypothesis set.

Supplementary Note 4

4. The inference device according to supplementary note 1, further comprising a difference rule extraction means configured to generate a third knowledge base formed by a rule of a difference in excluding a rule formed by a pair of the premise and the consequence from the first knowledge base, in which the rule formed by the pair is acquired by re-reversing a portion corresponding to a rule deriving the premise from the consequence within the first hypothesis set; and a difference data extraction means configured to extract observation data not included in the directed graph of the first hypothesis set in the first observation data, and generates third observation data by integrating the extracted data with the second observation data, wherein the inference execution means executes the abductive inference by using the third knowledge base and the third observation data, and generates the second hypothesis set.

Supplementary Note 5

5. The inference device according to any one of supplementary notes 1 to 4, wherein the inference execution means generates a best hypothesis from the second hypothesis set.

Supplementary note 6

6. An inference method comprising:

acquiring first observation data and first knowledge base which is formed by a rule representing a pair of a premise and a consequence of the premise;

reversing the premise and the consequence of the rule forming the first knowledge base, and generate a second knowledge base formed by a rule deriving the premise from the consequence;

executing an abductive inference using the second knowledge base and the first observation data, and generate a first hypothesis set represented by a directed graph; and extracting an element serving as a starting point in the directed graph representing the first hypothesis set, and generating second observation data, wherein the abductive inference is executed by using the first knowledge base and the second observation data, and a second hypothesis set is generated.

Supplementary note 7

7. A recording medium storing a program, the program causing a computer to perform a process comprising:

acquiring first observation data and first knowledge base which is formed by a rule representing a pair of a premise and a consequence of the premise;

reversing the premise and the consequence of the rule forming the first knowledge base, and generate a second knowledge base formed by a rule deriving the premise from the consequence;

executing an abductive inference using the second knowledge base and the first observation data, and generate a first hypothesis set represented by a directed graph; and extracting an element serving as a starting point in the directed graph representing the first hypothesis set, and generating second observation data, wherein the abductive inference is executed by using the first knowledge base and the second observation data, and a second hypothesis set is generated.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

12 Processor
21 Rule conversion unit
22 Inference execution unit
23 Data extraction unit
24 Difference rule extraction unit 25 Difference data extraction unit
D1 to D3 Observation data
KB1 to KB3 Knowledge base
100, 100a to 100c Abductive inference

What is claimed is:

1. An inference device comprising:
a memory storing instructions; and
one or more processors configured to execute the instructions to:
acquire first observation data and first knowledge base which is formed by a rule representing a pair of a premise and a consequence of the premise;
reverse the premise and the consequence of the rule forming the first knowledge base, and generate a second knowledge base formed by a rule deriving the premise from the consequence;
execute an abductive inference using the second knowledge base and the first observation data, and generate a first hypothesis set represented by a directed graph;
extract an element serving as a starting point in the directed graph representing the first hypothesis set, and generate second observation data,
generate a third knowledge base formed by rules of a difference in excluding rules formed by pairs of the premise and the consequence from the first knowledge base, the rules formed by the pairs being acquired by re-reversing rules deriving the premise from the consequence within the first hypothesis set; and
extract, as difference data, observation data not included in the directed graph of the first hypothesis set among the first observation data, and generate third observation data by integrating the difference data with the second observation data;
wherein the executes the abductive inference by using the third knowledge base and the third observation data, and generates a second hypothesis set as a latent hypothesis set having fewer hypothesis candidates than a latent hypothesis set that would be generated by executing the abductive inference using the first knowledge base and the first observation data without generating the second knowledge base, the second observation data, the third knowledge base and the third observation data.

2. The inference device according to claim 1, wherein the one or more processors are further configured to execute the abductive inference using the third knowledge base and the second observation data, and generates the second hypothesis set.

3. The inference device according to claim 2, wherein the one or more processors are further configured to extract observation data not included in the directed graph of the first hypothesis set in the first observation data, and generates third observation data by integrating the extracted observation data with the second observation data,
wherein the one or more processors are further configured to execute the abductive inference using the first knowledge base and the third observation data, and generates the second hypothesis set.

4. The inference device according to claim 1, wherein the one or more processors are further configured to generate a best hypothesis from the second hypothesis set.

5. An inference method comprising:
acquiring first observation data and first knowledge base which is formed by a rule representing a pair of a premise and a consequence of the premise;
reversing the premise and the consequence of the rule forming the first knowledge base, and generate a second knowledge base formed by a rule deriving the premise from the consequence;
executing an abductive inference using the second knowledge base and the first observation data, and generate a first hypothesis set represented by a directed graph;
extracting an element serving as a starting point in the directed graph representing the first hypothesis set, and generating second observation data,
generating a third knowledge base formed by rules of a difference in excluding rules formed by pairs of the premise and the consequence from the first knowledge base, the rules formed by the pairs being acquired by re-reversing rules deriving the premise from the consequence within the first hypothesis set; and
extracting, as difference data, observation data not included in the directed graph of the first hypothesis set among the first observation data, and generate third observation data by integrating the difference data with the second observation data,
wherein the abductive inference is executed by using the third knowledge base and the third observation data, and a second hypothesis set is generated as a latent hypothesis set having fewer hypothesis candidates than a latent hypothesis set that would be generated by executing the abductive inference using the first knowledge base and the first observation data without generating the second knowledge base, the second observation data, the third knowledge base and the third observation data.

6. A non-transitory computer-readable recording medium storing a program, the program causing a computer to perform a process comprising:
acquiring first observation data and first knowledge base which is formed by a rule representing a pair of a premise and a consequence of the premise;
reversing the premise and the consequence of the rule forming the first knowledge base, and generate a second knowledge base formed by a rule deriving the premise from the consequence;
executing an abductive inference using the second knowledge base and the first observation data, and generate a first hypothesis set represented by a directed graph;
extracting an element serving as a starting point in the directed graph representing the first hypothesis set, and generating second observation data,
generating a third knowledge base formed by rules of a difference in excluding rules formed by pairs of the premise and the consequence from the first knowledge base, the rules formed by the pairs being acquired by re-reversing rules deriving the premise from the consequence within the first hypothesis set; and
extracting, as difference data, observation data not included in the directed graph of the first hypothesis set among the first observation data, and generate third observation data by integrating the difference data with the second observation data,
wherein the abductive inference is executed by using the third knowledge base and the third observation data, and a second hypothesis set is generated as a latent hypothesis set having fewer hypothesis candidates than a latent hypothesis set that would be generated by executing the abductive inference using the first knowledge base and the first observation data without generating the second knowledge base, the second observation data, the third knowledge base and the third observation data.

7. The inference device according to claim 1, wherein the one or more processors is further configured to:

using the abductive inference, determine whether an event in a computer system is caused by a cyber-attack.

\* \* \* \* \*